United States Patent
Muuttonen et al.

(10) Patent No.: US 7,419,015 B2
(45) Date of Patent: Sep. 2, 2008

(54) ROCK DRILLING MACHINE AND AXIAL BEARING

(75) Inventors: Timo Muuttonen, Siuro (FI); Esa Rantala, Kyrönlahti (FI)

(73) Assignee: Sandvik Mining and Construction Oy, Tampere (FI)

( * ) Notice: Subject to any disclaimer, the term of this patent is extended or adjusted under 35 U.S.C. 154(b) by 26 days.

(21) Appl. No.: 10/541,160

(22) PCT Filed: Dec. 29, 2003

(86) PCT No.: PCT/FI03/00984

§ 371 (c)(1),
(2), (4) Date: Apr. 20, 2006

(87) PCT Pub. No.: WO2004/060617

PCT Pub. Date: Jul. 22, 2004

(65) Prior Publication Data

US 2006/0213690 A1    Sep. 28, 2006

(30) Foreign Application Priority Data

Jan. 3, 2003    (FI) ................................ 20030016

(51) Int. Cl.
*E21B 4/14*  (2006.01)
*E21B 1/24*  (2006.01)
*E21B 1/38*  (2006.01)

(52) U.S. Cl. .................. 175/296; 175/297; 175/321; 173/4; 173/212

(58) Field of Classification Search ............. 175/296, 175/297, 321; 173/4, 206, 212
See application file for complete search history.

(56) References Cited

U.S. PATENT DOCUMENTS

| 5,351,763 A | 10/1994 | Muuttonen |
| 5,479,996 A | 1/1996 | Jönsson et al. |
| 5,520,254 A * | 5/1996 | Weber .................. 173/128 |
| 6,186,246 B1 | 2/2001 | Muuttonen et al. |
| 6,273,199 B1 * | 8/2001 | Kiikka et al. .................. 173/1 |
| 6,318,478 B1 | 11/2001 | Kaneko |
| 6,854,538 B2 * | 2/2005 | Muuttonen .................. 175/414 |
| 6,877,569 B2 * | 4/2005 | Koskimaki .................. 173/1 |
| 7,032,684 B2 * | 4/2006 | Muuttonen et al. ............. 173/4 |
| 2005/0016774 A1 | 1/2005 | Comarmond |
| 2006/0213690 A1 * | 9/2006 | Muuttonen et al. .......... 175/296 |

FOREIGN PATENT DOCUMENTS

| EP | 0 856 637 A1 | 8/1998 |
| FI | 84701 | 8/1991 |
| FR | 2 596 681 | 10/1987 |
| FR | 2 837 523 | 9/2003 |
| JP | 11-033932 | 2/1999 |
| JP | 2001-334478 | 12/2001 |

* cited by examiner

*Primary Examiner*—Shane Bomar
(74) *Attorney, Agent, or Firm*—Drinker Biddle & Reath LLP (57) ABSTRACT

An axial bearing includes a first piston and a second piston. Axial contact surfaces between the pistons are arranged in the same pressure space. The same pressure fluid fed to the axial bearing acts on the contact surfaces and on working pressure surfaces of the pistons. A rock drilling machine is also provided with such an axial bearing.

14 Claims, 7 Drawing Sheets

ROCK DRILLING MACHINE AND AXIAL BEARING

BACKGROUND OF THE INVENTION

The invention relates to a rock drilling machine comprising at least: a frame; a percussion element for generating stress pulses; a shank arranged at the front of the percussion element in the percussion direction, the shank comprising a percussion surface for receiving said stress pulses; and further an axial bearing comprising at least: a first piston and a second piston; between the pistons, an axial first contact surface and an axial second contact surface, the contact surfaces being located in the same pressure space; at least one pressure duct for leading pressure fluid from a pressure source to the axial bearing; pressure surfaces in the pistons, on which surfaces the pressure fluid is arranged to act for axial movement of the pistons; and in which axial bearing the pistons are arranged to push the shank along a different travel length towards the percussion direction; the force of said pistons, by the action of the pressure fluid towards the percussion direction, being dimensioned such that the percussion surface is adjustable during drilling at the desired axial point for receiving the stress pulses.

The invention further relates to an axial bearing for a percussion rock drilling machine, the axial bearing comprising at least: a frame; at least a first piston and a second piston arranged in a space formed in the frame, both comprising at least one pressure surface; at least one pressure duct for leading pressure fluid to said pressure surfaces for axial movement of the pistons; and, between the pistons, axial contact surfaces located in the same pressure space.

It is known to use an axial bearing in a rock drilling machine for moving the shank to the intended percussion point during drilling and for adjusting the percussion power by adjusting the position of the shank. On the other hand, the axial bearing can be used to dampen stress pulses reflected from the rock back to the drilling machine. The axial bearing disclosed in U.S. Pat. No. 6,186,246 comprises two nested sleeves arranged in a space around the percussion piston, and of which one is in indirect contact with the rear end of the shank. The travel lengths of the sleeves towards the percussion direction are different and the sleeves are in contact with one another via an axial contact surface. A separate pressure duct for leading pressure medium is connected to a working pressure surface at the rear end of both sleeves. The outer sleeve is sealed to the frame and to the inner sleeve, and, furthermore, the inner sleeve is sealed to the percussion piston and to the outer sleeve. During drilling, both sleeves are able to rotate around their shafts and, furthermore, the sleeves can collide with each other in the axial direction. Accordingly, the contact surfaces between the sleeves are subjected to mechanical stress that wears them. A similar problem may present itself in the solution according to U.S. Pat. No. 5,896,937.

BRIEF DESCRIPTION OF THE INVENTION

The object of the present invention is to provide a new and improved rock drilling machine provided with an axial bearing, and an axial bearing.

The rock drilling machine of the invention is characterized in that the same pressure fluid fed to the axial bearing is arranged to act on said piston contact surfaces and pressure surfaces.

The axial bearing of the invention is characterized in that the same pressure fluid fed to the axial bearing is arranged to act on said piston contact surfaces and pressure surfaces.

An essential idea of the invention is that the axial bearing comprises a first piston and a second piston, both comprising pressure surfaces to enable axial movement of the pistons by means of pressure fluid. Furthermore, between the pistons are an axial first contact surface and an axial second contact surface that are located in the same pressure space. The same pressure fluid, fed to the axial bearing, acts on both the contact surfaces and the pressure surfaces.

An advantage of the invention is that the axial contact surfaces between the pistons continuously have a good lubrication achieved by means of the pressure fluid, which enables prevention of wear of the contact surfaces. In addition, the pressure fluid may serve as a sufficiently efficient damper between the contact surfaces. A further advantage is that one pressure medium can be fed to the axial bearing from one pressure source, resulting in a small number of ducts and a simple structure.

The essential idea of an embodiment of the invention is that the pressure fluid is arranged to flow into and out of the pressure space comprising the contact surfaces. This being so, the pressure fluid is able to flush off any impurities from the contact surfaces. In addition, when flowing, the pressure fluid is able to cool the contact surfaces.

The essential idea of an embodiment of the invention is that the first piston and the second piston are sleeve-like pieces arranged around the percussion element. The first piston may be an elongated sleeve supported in the area of its first and second ends to the frame. Furthermore, the first piston may comprise, in the section between the first end and the second end, a shoulder provided on its outer periphery and comprising an axial first contact surface facing towards the second piston. The second piston is arranged around the first piston. The second piston comprises a second contact surface facing the percussion direction and arranged in the same pressure space as the first contact surface.

The essential idea of a preferred embodiment of the invention is that a third pressure space is located in front of the first contact surface of the first piston. Furthermore, a second pressure space is provided between the first contact surface and the second contact surface. In addition, behind the second piston is provided a first pressure space that is in contact with the first pressure duct for feeding pressure fluid to the axial bearing. The pressure fluid is arranged to flow past the second piston from the first pressure space to the second pressure space and further from the second pressure space to the third pressure space. In this case it is sufficient to feed the pressure of only one pressure fluid to the axial bearing, the flow and pressure of the pressure fluid being suitable adjusted and guided to the different pressure spaces in order to make the axial bearing operate in the desired manner.

The essential idea of a preferred embodiment of the invention is that at least one throttle or the like is provided between the third pressure space and the second pressure space to act on the pressure fluid flowing into the first pressure space. The throttle acts on the pressure of the second pressure space and thus the movements of the sleeves and their collisions with one another may be dampened.

The essential idea of a preferred embodiment of the invention is that the third pressure space is in contact with at least one pressure duct wherein the flow of pressure fluid is arranged away from the axial bearing. Furthermore, the pressure duct may be provided with at least one element for affecting the magnitude of the discharging flow and, consequently, for affecting the pressure acting in the third pressure space.

BRIEF DESCRIPTION OF THE FIGURES

The invention will be described in more detail in the attached drawings, in which.

For the sake of clarity, the figures show the invention in a simplified manner. In the figures, like parts are designated with like reference numerals.

DETAILED DESCRIPTION OF THE INVENTION

Figures 1, 2:
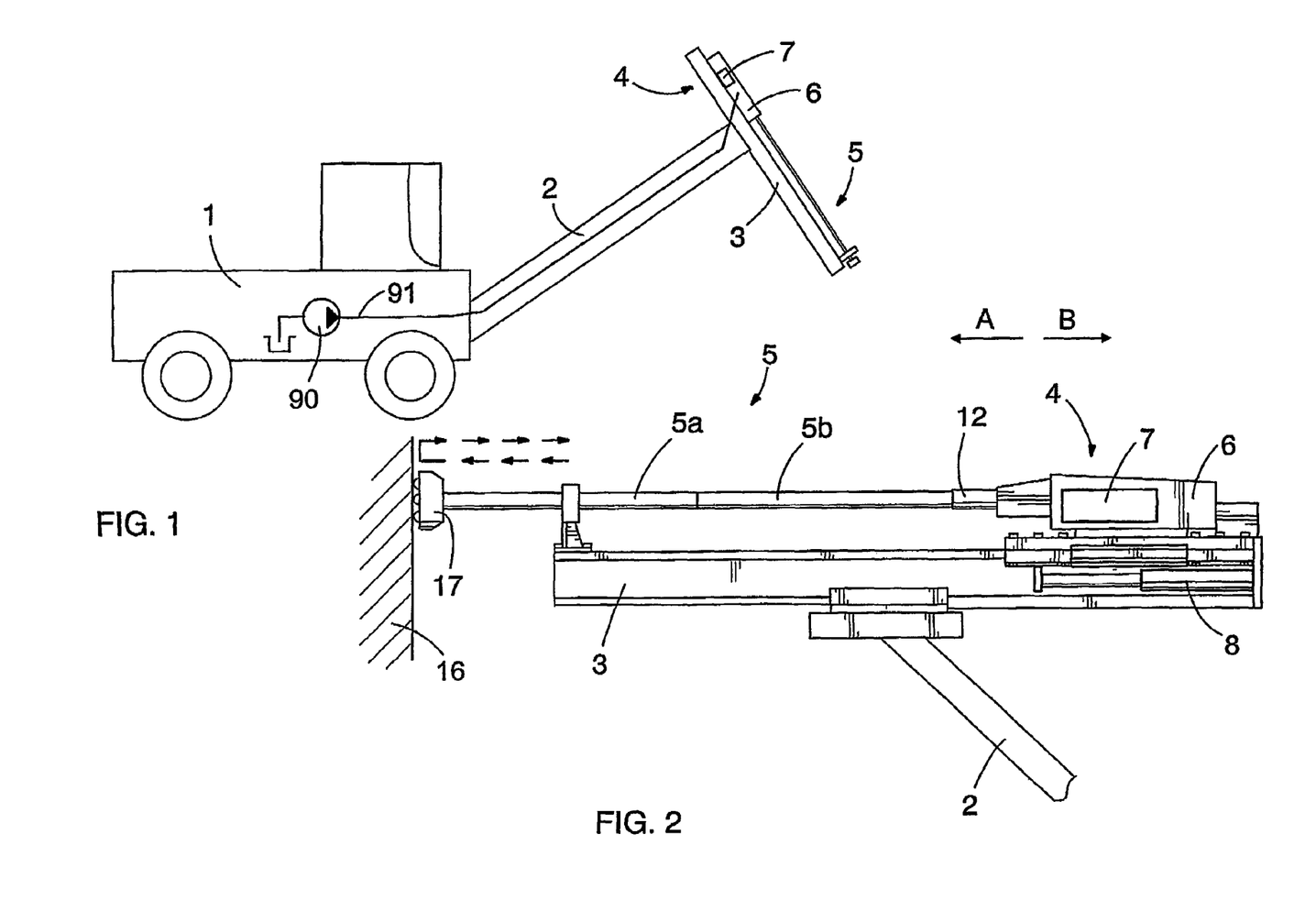
FIG. 1 is a schematic side view of a rock drilling apparatus.
FIG. 2 is a schematic side view of a rock drilling machine.

FIG. 1 shows, in a simplified manner, a rock drilling apparatus comprising a carrier 1, one or more booms 2, and a feeding beam 3 arranged at the free end of the boom 2. Further, a rock drilling machine 4 is arranged on the feeding beam 3. On the carrier 1 of the rock drilling apparatus, a pressure medium source 90, such as a hydraulic pump or the like, can be arranged for leading the generated pressure fluid pressure along a pressure circuit 91 to the rock drilling machine 4.

FIG. 2 shows that the rock drilling machine 4 is arranged movable relative to the feeding beam 3. The drilling machine 4 is movable on the feeding beam 3 by means of a feeding device 8. The rock drilling machine 4 comprises a shank 12 to which necessary drilling equipment 5 composed of one or more drill rods 5a, 5b, and a drill bit 17, for example, can be connected. The rock drilling machine 4 comprises a percussion device 6 for generating percussion pulses in the shank 12. In addition, the rock drilling machine 4 typically comprises a rotating device 7 for rotating the shank 12 around its longitudinal axis. The shank 12 transfers percussion, rotational and feeding forces to the drilling equipment 5, which transfers them further to a rock 16 to be drilled.

Figure 3:
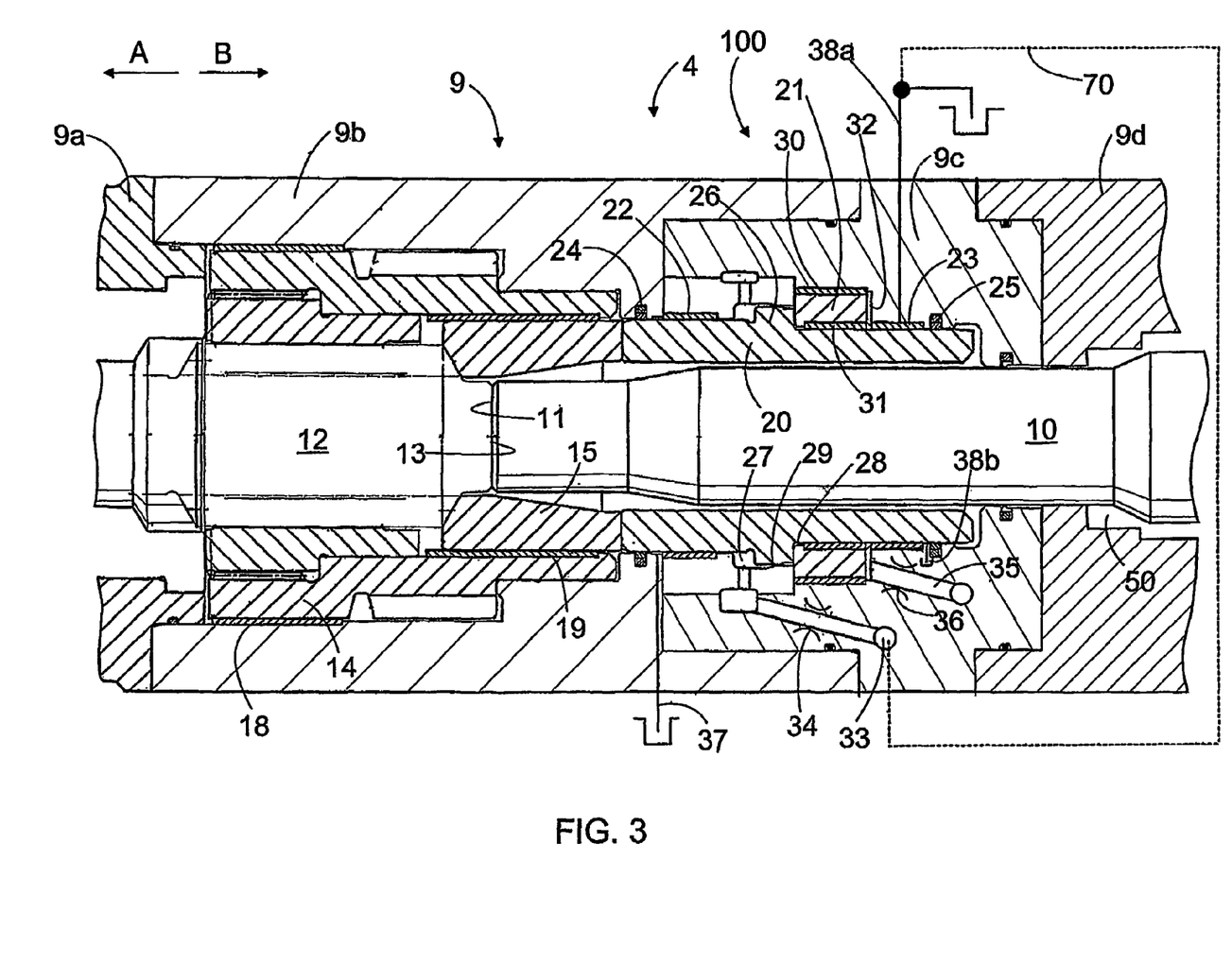
FIG. 3 is a schematic sectional view of a part of the rock drilling machine according to the invention.

FIG. 3 shows part of the structure of the rock drilling machine 4 in section. The rock drilling machine 4 comprises a frame 9 composed of one or more interconnected frame parts 9a to 9d. The percussion device 6 comprises a percussion element 10, which may be a percussion piston arranged to move axially by the action of a pressure medium, electricity or the like such that a front end 11 at the percussion element 10 is arranged to hit a percussion surface 13 at the rear end of the shank 12. Let it be mentioned that in the present application, the front end of the components of the drilling machine 4 refer to the end on the side of the percussion direction A and, correspondingly, the rear end to the end on the side of the return direction B. Around the shank 12 may be provided a rotation sleeve 14 for transferring the rotational torque achieved with the rotating device 7 to the shank 12. The coupling between the shank 12 and the rotation sleeve 14 allows the shank 12 to move in the axial direction. The shank 12 can be supported at its rear side by means of a support sleeve 15. As is observed, the rotation sleeve 14 and the support sleeve 15 may be supported by means of bearings 18 and 19 to the frame 9 and to one another.

The axial position of the shank 12 can be affected by means of an axial bearing 100 comprising at least two axially movable pistons. The rear end of the support sleeve 15 may be acted upon by a sleeve-like first piston 20, which may be arranged in a space provided around the percussion element 10. Furthermore, a sleeve-like second piston 21 may be arranged around the first piston 20. Between the first piston 20 and the percussion element 10 may be provided a clearance, due to which the movements of the percussion element 10 have no direct effect on the movements of the pistons 20, 21 or on wear. The first piston 20 may be firmly mounted on bearings to the frame 9 of the drilling machine with a first bearing element 22 in the area of the first end and in the area of the second end with a second bearing element 23. In this case, the first piston 20 is able to move axially along a predetermined travel length and rotate around its longitudinal axis. Furthermore, the first end of the first piston 20 may comprise first seals 24 and the second end second seals 25 such that a pressure space is formed between the frame 9 and the outer periphery of the piston 20. Since the seals 24 and 25 may be arranged in the frame 9c, no seal grooves need be arranged in the first piston 20. Furthermore, the second piston 21 may lack seals, which further simplifies the structure of the axial bearing 100 and improves durability. The axial bearing 100 may comprise a first pressure space 32, a second pressure space 28, and a third pressure space 27.

A shoulder 26 may be arranged at the outer periphery of the first piston 20, in the section between its first end and second end. The third pressure space 27 may be arranged in front of the shoulder 26, and the second pressure space 28 may be arranged behind the shoulder 26. A narrow gap may be arranged between the shoulder 26 and the frame 9, constituting a throttle 29 between the third pressure space 27 and the second pressure space 28. The second piston 21 may be placed around the first piston 20, behind the shoulder 26. Thus, the second piston 21 may be located in the section between the first piston 20 and the bearings 22 and 23. The second piston 21 may be mounted in bearings to the frame 9 with a bearing element 30 and to the first piston 20 with a bearing element 31. On the side of the rear end of the second piston 21, a first pressure space 32 may be provided. The first piston 20 and the second piston 21 can be moved axially relative to one another. However, the axial movement of the second piston 21 may be dimensioned shorter than that of the first piston 20. Furthermore, as FIG. 3 shows, the first piston 20 may be longer and also have a substantially larger mass than the second piston 21.

The third pressure space 27 may be in contact with a second pressure duct 33, in which a control pressure $P_s$ acts. At least one throttle 34 for affecting the flow of the pressure duct 33 may be provided in the second pressure duct 33. Furthermore, the first pressure space 32 may be in contact with a first pressure duct 35. The first pressure duct 35 may be in contact with a percussion pressure duct. Alternatively, another pressure is applied to the duct 35. The first pressure duct 35 may be provided with at least one throttle 36 for adjusting the flow of the pressure fluid acting in the pressure duct. The axial contact surfaces of the first piston 20 and the second piston 21 are located in the second pressure space, allowing the pressure fluid fed from the first pressure duct 35 to lubricate and cool the contact surfaces. In addition, the second pressure space 28 may act as a damper between the pistons 20, 21. The pressures of the pressure spaces 27 and 32 and the throttle 29 may act on the pressure in the second pressure space 28.

Furthermore, the front end of the first piston 20 may be in contact with a first discharge channel 37 and, correspondingly, the rear end of the piston 20 may be in contact with a second discharge channel 38a or alternatively to a discharge channel 38b. Leakage flows passed through the bearings 22 and 23 can be led to the discharge channels 37 and 38. FIG. 3 shows with a broken line 70 an alternative solution, wherein the pressure of the second discharge channel 38a is led to the duct 33, where it constitutes at least part of the control pressure $P_s$.

Figure 4:
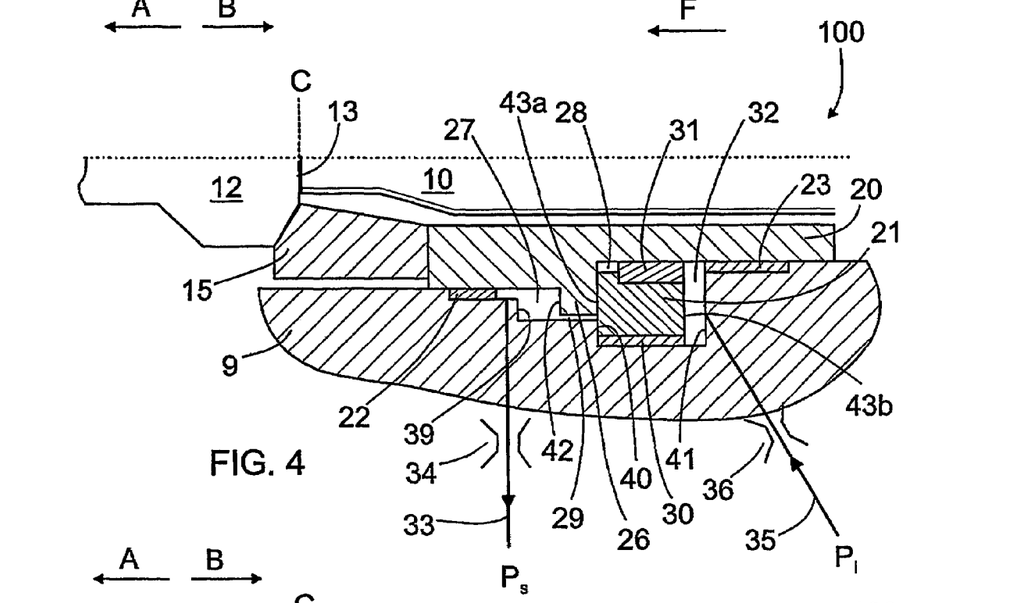
FIGS. 4 and 5 are schematic sectional views of the axial bearing according to the invention in its two different positions, FIG. 6 schematically shows, by means of graphs, the movements of the pistons of an axial bearing and a shaft during percussion in a rock drilling machine according to FIG. 3, FIG. 7 schematically shows, by means of graphs, the pressures acting in the pressure spaces of the pistons of an axial bearing of the drilling machine according to FIG. 3 as a function of time.
Figure 5:
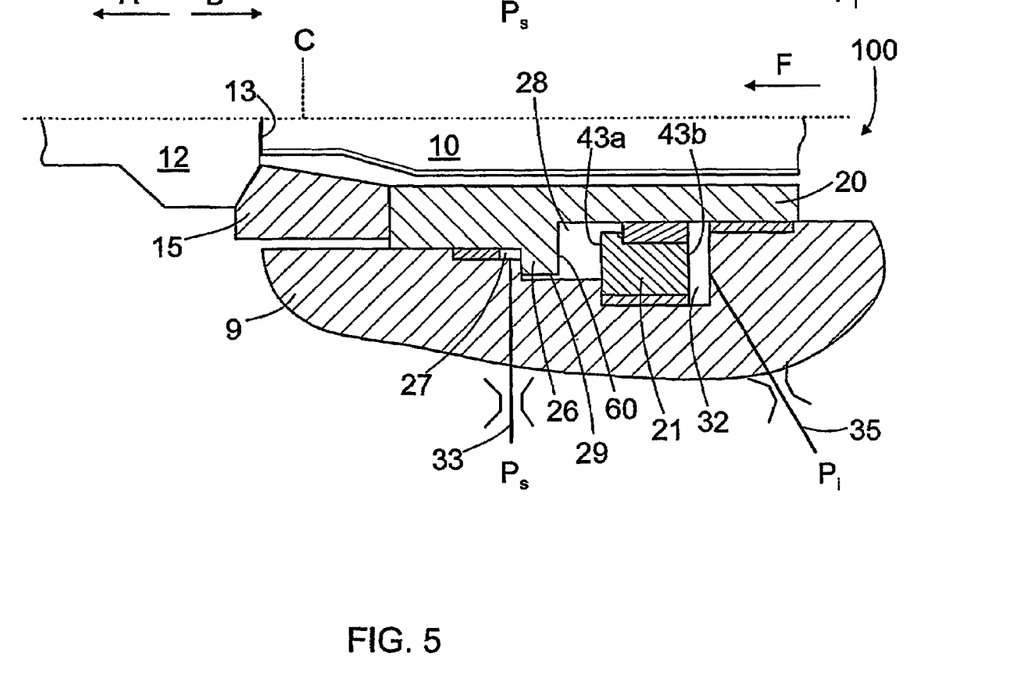

FIGS. 4 and 5 show a part of the rock drilling machine 4 according to the invention, cut at the mid axis of the percussion element 10. For the sake of clarity, FIGS. 4 and 5 do not show all necessary bearings, seals and ducts. As FIG. 4 shows, the axial movement of the first piston 20 may be larger than that of the second piston 21. The movement of the first piston 20 towards the percussion direction A can be restricted by a surface 42 and a second surface 39 in the frame 9, and further, the movement towards the return direction B can be restricted by the second piston 21 with a surface 43a, on which a surface 60 of the piston 20 thus rests. In the above situation, the contact surfaces 60 and 43a between the pistons 20, 21 are lubricated and cooled by the pressure fluid. The axial movement of the second piston 21 can be restricted by surfaces 40 and 41 of a ring-shaped space around the first piston 20. Furthermore, pressure fluid fed to the axial bearing 100 may efficiently lubricate and cool the surfaces 39, 42; 43b, 41 between the pistons 20, 21 and the frame 9. The axial movement of the first piston 20 can be dimensioned larger than the movement required to move the percussion element 10 to be received by a damper 50. Accordingly, as the feed resistance decreases, e.g. when drilling takes place in a soft rock, the first piston 20 can move the percussion surface 13 in the shank 12 towards the percussion direction A, whereby the percussion element 10 hits the percussion surface 13 in front of the intended percussion point C. In this case, the damper 50 may reduce the percussion power to be transferred to a tool. The working pressure surfaces 43a and 43b in the second piston 21 are substantially equal in size. On surface 43b, a higher pressure acts than on surface 43a, as a result of which a force is generated that pushes the second piston 21 towards the percussion direction A and whose magnitude depends on the pressure difference between said surfaces. The combined power of the pistons 20 and 21 towards the percussion direction A can be dimensioned larger than the feed force F. Alternatively, the power effect of the second piston 21 alone is dimensioned larger than the feed force. In this case, the second piston 21 settles towards the shoulder 40 in the percussion direction A, and the shank 12 is at the intended percussion point C, whose location is determined taking into account a maximally effective transfer of stress pulses from the percussion element 10 to the shank 12. Furthermore, the return movement, caused by the stress pulses returning from the rock, can be damped by means of the pistons 20, 21, as will be described later in connection with FIGS. 6 and 7.

When the percussion surface 13 is at the intended percussion point C, the second piston 21 is projected into its foremost position in the manner shown in FIG. 4, against the shoulder 40 in the frame 9. At the same time, the second piston 21 has pushed the first piston 20 in the percussion direction A such that the support sleeve 15 supports the shank 12. The pressure of the first pressure duct 35 acts on the rear end of the second piston 21. The pressure acting in the second pressure space 28 acts on the front end of the second piston 21 and the magnitude of said pressure can be affected by adjusting the pressure acting in the first pressure space 27 and, further, by means of the throttle 29 between the third pressure space 27 and the second pressure space 28. The working pressure surfaces 43a and 43b of the second piston 21, acting in the percussion direction and in the return direction, are substantially equal in size. In the solution of the figure, the bearing element 31 constitutes part of the working pressure surfaces 43a, 43b of the second piston 21.

The pressure acting in the third pressure space 27 can be affected by adjusting the control pressure in the second pressure duct 33. The first working pressure surface 42 of the shoulder 26 towards the first pressure space 27 is smaller than the second working pressure surface 60 of the shoulder 26 towards the second pressure space 28, which results in the generation of a force pushing the piston 20 towards the percussion direction A. Accordingly, during normal drilling, the pistons 20, 21 are in the position shown in FIG. 4. Thus, the force in the percussion direction A acting on the first piston 20 is not alone sufficient to move the first piston 20 forward, but it is, by the action of the feeding force F, settled against the front end of the second piston 21.

The control pressure $P_s$ acting in the third pressure space 27 is typically adjusted lower than the pressure $P_i$ acting in the first pressure space 32. This allows pressure fluid to flow from the first pressure space 32 over the bearings 30 and 31 to the second pressure space 28 and further through the throttle 29 to the third pressure space 27. By suitable dimensioning of the clearances of the front end of the first piston 20, the leakage flow to the discharge channel 37 can be arranged smaller than the flow of pressure fluid from the second pressure space 28 to the third pressure space 27. Accordingly, the flow in the second pressure duct 33 can be outwards. This being so, impurities in the pressure space of the pistons 20, 21 can be discharged from the drilling machine 4, whereby they do not cause damage to the bearings 22, 30 and 31, for example. In addition, the control of the control pressure $P_s$ can be arranged merely by adjusting the discharging flow. The adjustment may be arranged for instance by arranging, in conjunction with the drilling machine 4, a control valve that can be controlled for instance electrically from the carrier 1 of the rock drilling apparatus. The discharging pressure fluid flow can be led to a common return duct leading from the boom 2 to the carrier 1, whereby the adjustment of the control pressure $P_s$ requires no special pressure medium duct. In addition, since the percussion pressure can be led to the duct 35, no special pressure ducts have to be necessarily led to the axial bearing 100.

FIG. 5 shows a situation where the first piston 20 is moved to its foremost position. This can take place for instance during drilling into a soft rock. When the drilling resistance falls, the shank 12 can move, pushed by the first piston 20, to the front of the intended percussion point C. This is because the force generated from the feeding force F is lower as the drilling resistance falls, whereby the first piston 20 is able to move forward by the action of the force affecting its second working pressure surface 60. This way the rock contact of the drilling equipment 5 can be kept continuous during the drilling, enabling the avoidance of the generation of harmful tensile stress in the drilling equipment 5.

Once the percussion surface 13 is moved to the front of the intended percussion point C, part of the percussion of the percussion piston 10 can be received by means of the damper 50. Accordingly, the percussion power can be reduced in a situation where a high percussion power may cause problems.

The second pressure space 28 may act as a damper between the pistons 20, 21. When the first piston 20 rapidly moves backward by the action of a pressure pulse reflected back from the drilling equipment 5 to the piston 20, the pressure acting in the second pressure space 28 dampens the collision of the sleeves 20, 21 with one another. In addition, the second pressure space 28 acts as the damper of the second piston 21 towards the percussion direction A, since it dampens the collision of the piston 21 towards the shoulder 40. FIG. 2 illustrates the reflected stress pulse with arrows 80.

Figure 6:
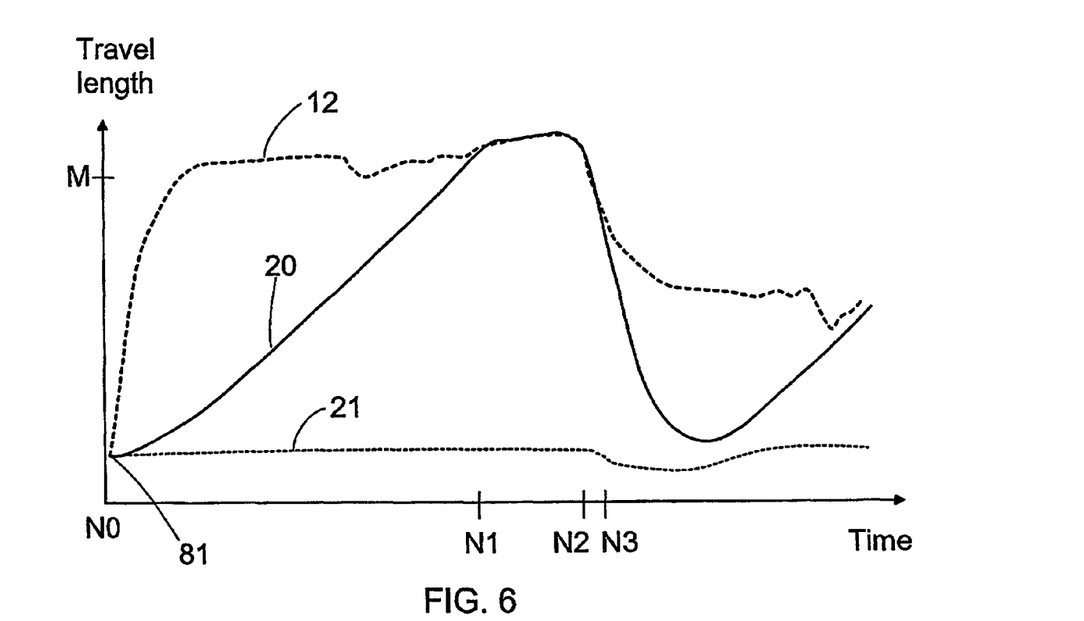

FIG. 6 shows graphs describing the axial movement position of the different components of the drilling machine 4, the graphs being defined by simulating a drilling machine according to FIG. 3. The vertical axis shows the travel length and the horizontal axis the time. Curve 12 describes the movement of the shank 12, curve 20 describes the movement of the first piston 20, and further, curve 21 describes the movement of the second piston 21.

Figure 7:
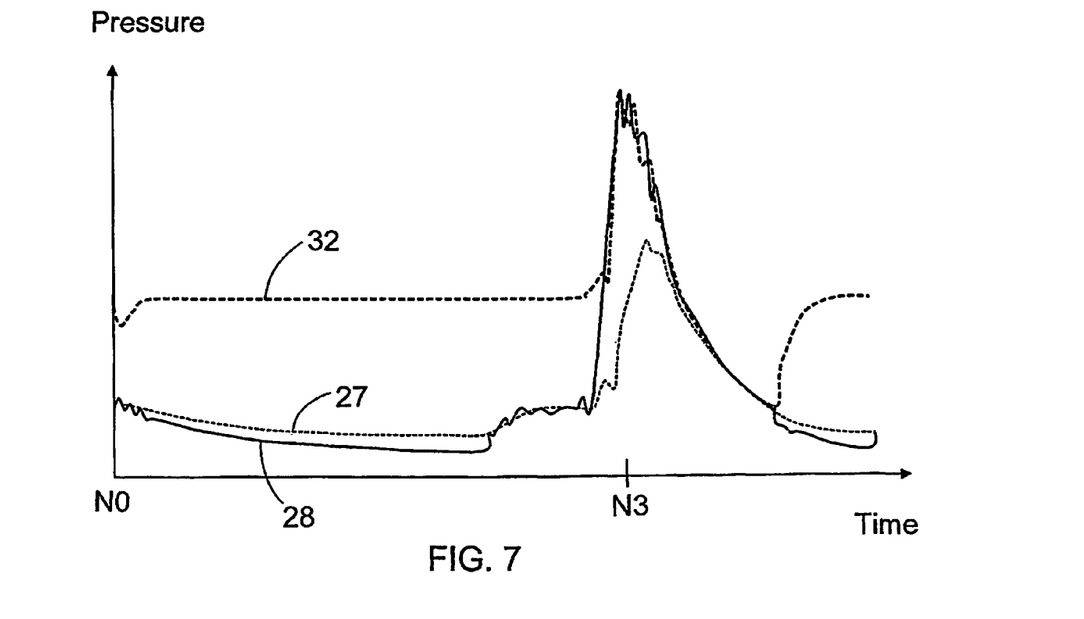

FIG. 7 shows the pressures in the pressure spaces of the axial bearing 100 corresponding to the simulation of FIG. 6. The vertical axis shows the pressure and the horizontal axis the time. Curve 27 describes the pressure in the third pressure space 27, curve 28 describes the pressure in the second pressure space 28, and further, curve 32 describes the pressure in the first pressure space 32.

In FIG. 6, a percussion occurs at point 81, at time N0. The force of the percussion makes the shank 12 move forward by distance M. The first piston 20 reaches the shank 12 at time N1. The time the piston 20 reaches the shank 12 can be affected by adjusting the control pressure $P_s$ and by the dimensioning of the throttle 29. By studying curve 20 in FIG. 6, one also observes that approximately at time N2, a compressive stress pulse returning from the drilling equipment 5 arrives and makes the first piston 20 abruptly move backwards. This, in turn, causes a significant rise in pressure in the second pressure space 28, which is clearly seen by studying curve 28 in FIG. 7 at time N3. A high pressure is acting at that time in the second pressure space 28, and it resists the backward movement of the first piston 20. At the same time, the high pressure acting in the second pressure space 28 affects the working pressure surface 43a of the second piston 21 and pushes the second piston 21 backwards. Accordingly, the pistons 20, 21 do not collide with one another. The backward movement of the second piston 21 can be observed by studying curve 21 in FIG. 6 at time N3. The magnitude of the pressure and the damping effect generated in the second pressure space 28 can be affected by means of the throttle 29. In addition, the magnitude of the dampening of the pressure fluid flow from the first pressure space 32 and the backward movement of the second piston 21 can be affected by adjusting the throttle 36 in the first pressure duct 35. On the other hand, the throttle 36 also dampens the forward movement of the second piston 21 after the effect of the pressure pulse is ceased. Since the mass of the first piston 20 may be relatively large, it is able to efficiently dampen the compressive stress pulses reflected from the drilling equipment 5 to the drilling machine 4.

On the other hand, by suitably dimensioning the throttle 29 between the first piston 20 and the frame 9 and also by suitably adjusting the control pressure $P_s$ and the pressure affecting the first pressure space 32, a situation may be achieved where the first piston 20 does not affect the shank 12 until two drill rods 5a and 5b are connected to the shank 12. This being so, at the start of the drilling, i.e. when the drilling takes place with only one drill rod 5a being connected, the first piston 20 does not substantially dampen the stress pulse reflected back from the drilling equipment 5, instead, the stress pulse is received by the percussion element 10 that is still against the percussion surface 13 of the shank 12 and initiates a return movement by the action thereof. An advantage is that when the percussion element 10 is arranged to move axially back and forth, the percussion frequency increases due to the return pulse, since the return movement of the percussion element is accelerated due to the reflecting stress pulse. A higher percussion frequency increases drilling power.

When percussion is to be utilized for opening stuck joints of the drilling equipment 5, the support given by the first piston 20 to the shank 12 during the percussion can be eliminated or reduced, whereby a tensile stress is generated in the drilling equipment 5 by the action of the percussion, the tensile stress facilitating the opening of the joints. For the time of the detaching percussion, the second pressure duct 33 can be connected to an external tank duct such that the pressure in the third pressure space 27 and in the second pressure space 28 can be lowered, whereby the movement of the first piston 20 towards the percussion direction A is hindered.

Figure 8:
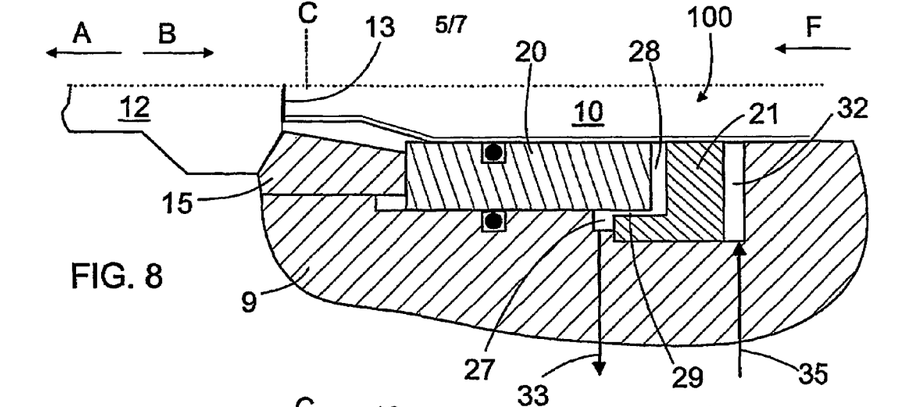
FIGS. 8 to 12 are schematic sectional views of parts of embodiments of the invention in situations where the percussion surface is shifted to the front of the intended percussion point.
Figure 9:
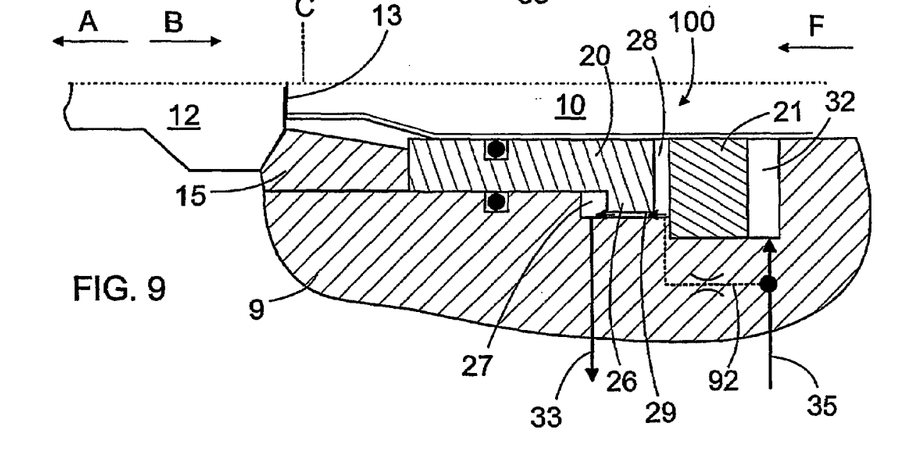
Figure 10:
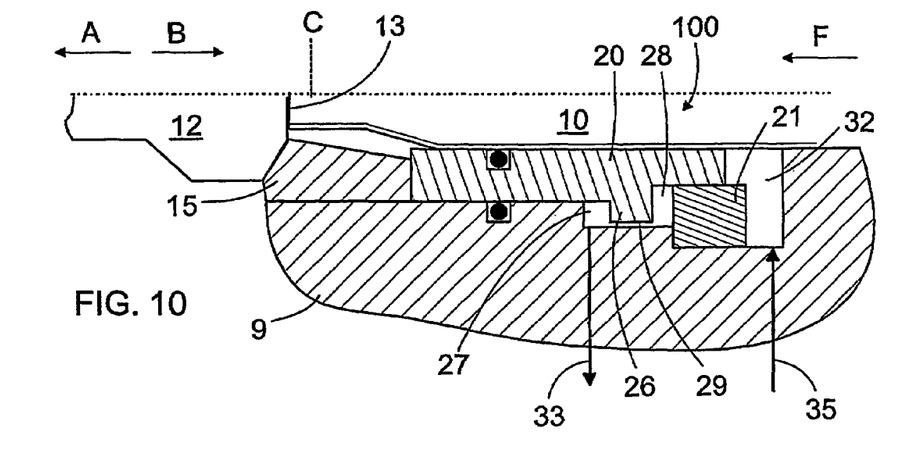
Figure 11:
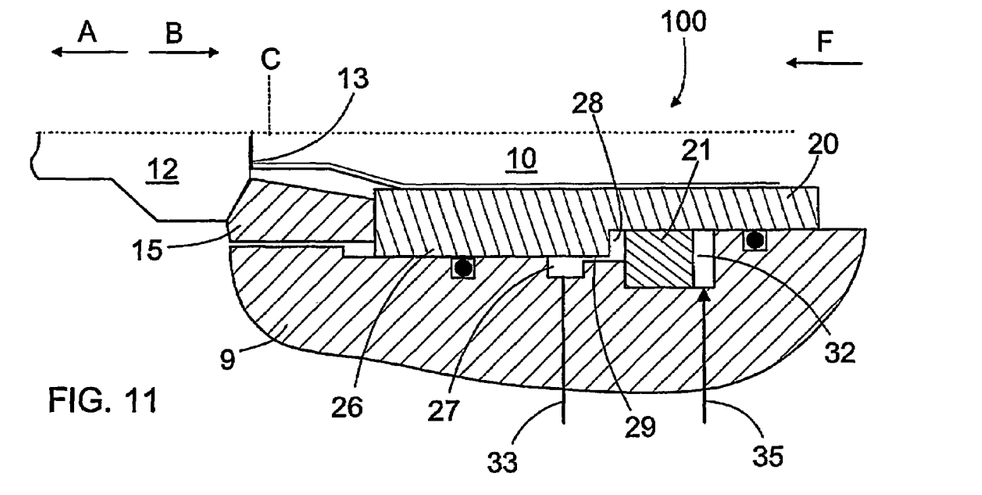
Figure 12:
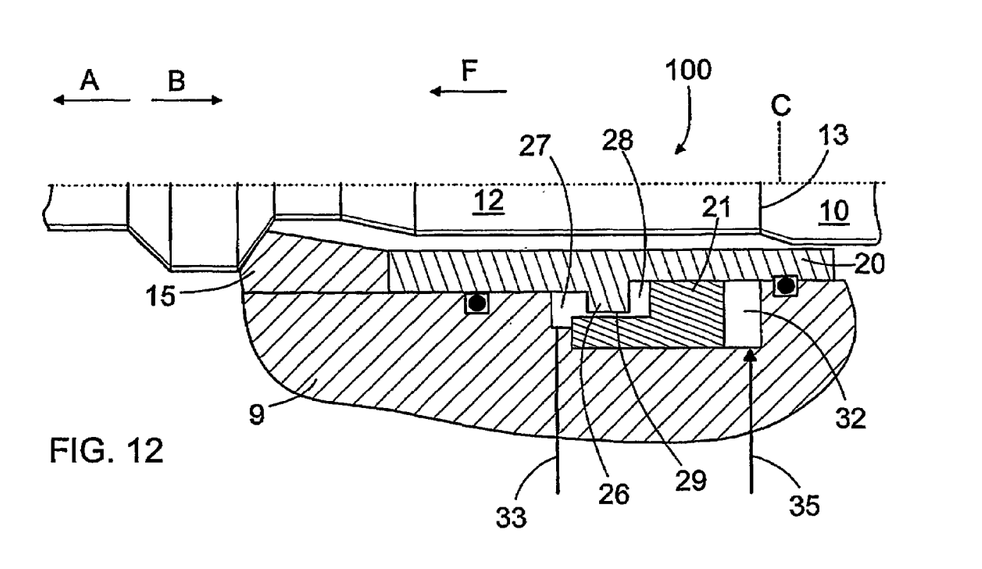

FIGS. 8 to 12 further show details of embodiments of an axial bearing 100. In FIGS. 8 to 12, the structures are cut at the point of the mid axis of the percussion element 10. For the sake of clarity, the bearing elements of the pistons 20, 21 are not shown. Furthermore, for the sake of clarity, the axial bearing 100 is shown in a situation where the second piston 21 is moved to the front of the intended percussion point C, allowing the second pressure space 28 to be more clearly observed. In FIGS. 8 to 10, the first piston 20 is an elongated sleeve, whose front part is sealed both to the percussion element 10 and to the frame 9. In FIGS. 11 and 12, only the outer periphery of the first piston 20, in the area of its ends, is sealed to the frame 9.

In the embodiment of FIG. 8, the first piston 20 comprises no shoulder on the outer periphery. The second piston 21 is a sleeve-like piece arranged on the side of the rear end of the first piston 20. In the second piston 21, the end surface facing the percussion direction A may comprise a recess, inside which the first piston 20 is able to partially settle. Pressure fluid can be led to the first pressure space 32 from the first pressure duct 35, whereafter the pressure fluid is able to flow via the second pressure space 28 to the third pressure space 27. A throttle 29 may be provided between the recess of the second piston 21 and the rear end of the first piston 20. The third pressure space 27 may be in contact with the second pressure duct 33. The axial first contact surface of the first piston 20 and the axial second contact surface of the second piston 21 are located in the second pressure space 28. This being so, the pressure fluid led to the axial bearing 100 lubricates and cools the contact surfaces in the pressure space 28. In addition, the pressure medium in the second pressure space 28 may dampen the movements of the pistons 20, 21.

In FIG. 9, the rear end of the first piston 20 comprises a shoulder 26. Between the shoulder 26 and the frame 9 may be provided a narrow gap, which constitutes a throttle 29 between the third pressure space 27 and the second pressure space 28. The pressure fluid fed from the first pressure duct 35 is able to flow past the second piston 21 to the second pressure space 28. The axial first contact surface at the rear end of the first piston 20 and the axial second contact surface at the front end of the second piston 21 are located in the second pressure space 28. Furthermore, the frame 9 may comprise a duct 92 that is, via a pressure circuit 91, in contact with the same pressure source 90 as the first pressure duct 35. The duct 92 may comprise a control member, such as a throttle for affecting the flow of pressure fluid flowing into the second pressure space 28.

In FIG. 10, the section between the ends of the first piston 20 comprises a shoulder 26 at the outer periphery. A throttle 29 may be provided between the shoulder 26 and the frame 9. The axial first contact surface in the shoulder 26 of the first piston 20 and the second contact surface at the front end of the second piston 21 are located in the second pressure space 28.

In FIG. 11, the first piston 20 comprises a shoulder 26 extending from the front end of the piston 20 to the middle section of the piston. Thus, the diameter of the front end of the first piston 20 is larger than the diameter of its rear part. The shoulder 26 comprises an axial first contact surface pointing in direction B. The front end of the second piston 21 comprises an axial second contact surface pointing in direction A. The first and second contact surfaces are located in the second pressure space 28, wherein the pressure fluid fed to the axial bearing 100 is acting. Furthermore, between the shoulder 26 and the frame 9 may be provided a gap constituting a throttle 29 between the third pressure space 27 and the second pressure space 28.

In FIG. 12, the section between the ends of the first piston 20 is provided with a shoulder 26 having an axial first contact surface pointing in direction B. The end surface, pointing towards direction A, of the second piston 21 comprises a recess dimensioned in a manner allowing the shoulder 26 to move in the recess. Between the recess and the shoulder 26 a narrow gap may be provided that constitutes a throttle 29 between the third pressure space 27 and the second pressure space 28. A second axial contact surface is provided in the bottom of the recess in the second piston 21. The first contact surface and the second contact surface are located in the second pressure space 28, wherein pressure fluid fed to the axial bearing 100 is acting. As distinct from the previous figures, the first piston 20 and the second piston 21 may be arranged either entirely or partly around the shank 12.

Figure 13:
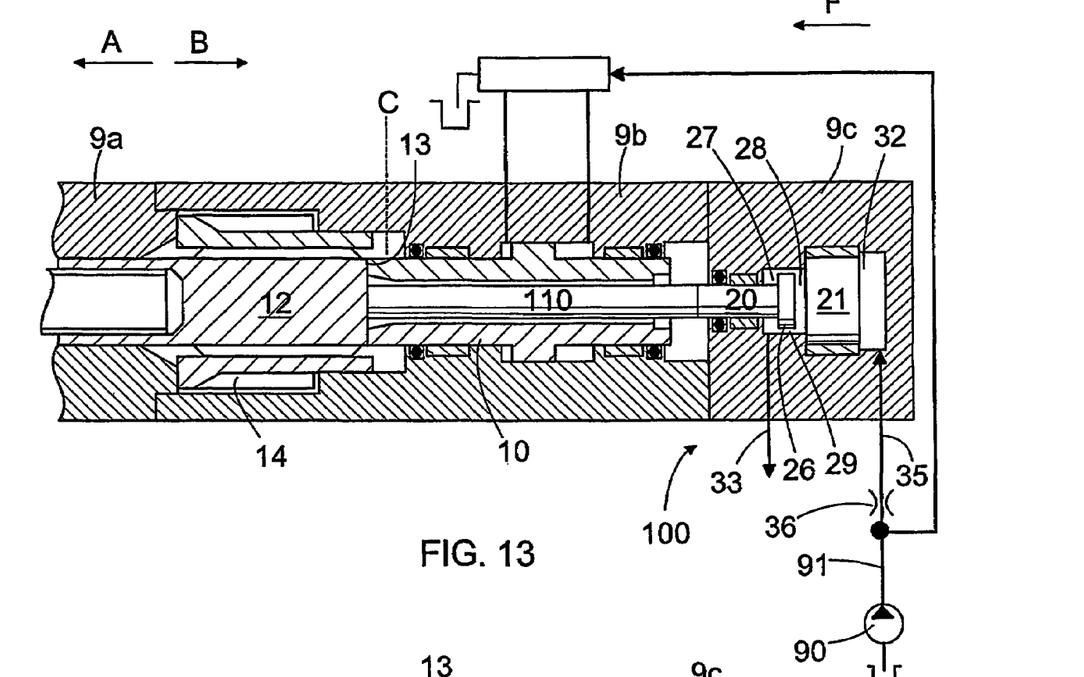
FIGS. 13 to 15 are further schematic sectional views of rock drilling machines provided with an axial bearing according to the invention.

FIG. 13 shows the construction of a rock drilling machine, where the axial bearing 100 is arranged at the rear end of the drilling machine. The percussion piston 10 may be a sleeve-like piece, through which an elongated spacing piece 110 may be arranged. The front end of the spacing piece 110 may be arranged against the rear end of the shank 12 and its rear end may be affected by the axial bearing 100, which may be arranged in its entirety to the rear side of the percussion piston 10. The axial bearing 100 may comprise a first piston 20 and, axially behind it, a second piston 21. The front end of the first piston 20 may be arranged to act on the spacing piece 110. The rear end of the first piston 20 may comprise a shoulder 26. Between the shoulder 26 and the frame 9c of the axial bearing 100, a narrow gap may form, which may act as a throttle 29 between the third pressure space 27 and the second pressure space 28. The axial first contact surface at the rear end of the first piston 20 and the axial second contact surface at the front end of the second piston 21 are located in the pressure space, wherein pressure fluid fed to the axial bearing 100 is acting.

In the solution according to FIG. 13, the mass of the first piston 20 may be relatively small, since the spacing piece 110 and the first piston 20 form together a sufficiently large mass that can extend to the front of the intended percussion point C and is able to receive stress pulses returning from the rock. Furthermore, an advantage of the construction presented is that the percussion element 10 can be mounted in bearings relatively close to the intended percussion point C.

FIG. 13 further shows that the axial bearing 100 and the percussion device can be connected to the same pressure medium circuit 91, in which the pressure source 90 is arranged to generate pressure. The first duct 35 leading to the axial bearing 100 may comprise one or more control members 36 for affecting the flow to be led to the axial bearing 100.

Figure 14:
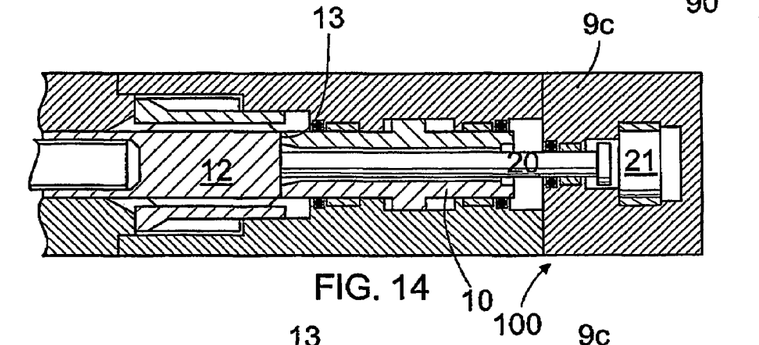
Figure 15:
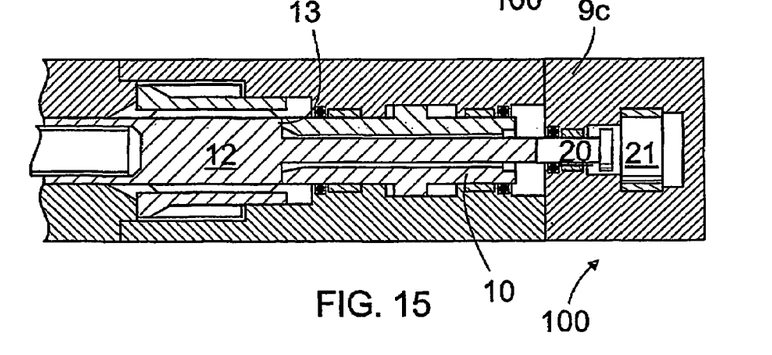

Another feasible structure comprises no separate spacing piece 110. In FIG. 14, the first piston 20 extends through the percussion element 10 up to the percussion surface 13. In FIG. 15, the spacing piece 110 constitutes part of the shank 12, the shank 12 being at least partly nested within the percussion element 10.

As the above presented figures illustrate, the axial bearing 100 may be an integrated part of the rock drilling machine 4. On the other hand, the axial bearing 100 may be a separate piece adaptable between the frame parts of the rock drilling machine 4 or onto the extension of the percussion device. The axial bearing 100 may have a separate frame 9c in which spaces are formed for the pistons 20 and 21, the necessary pressure ducts and pressure spaces. If the axial bearing 100 wears or gets damaged, it can be relatively fast and easily replaced with a new one.

The detailed structure of the rock drilling machine 4 may deviate from the one shown in the figures. Accordingly, in some cases the front end of the first piston 20 may be arranged to act directly on the rear end of the shank 12, eliminating the need for the support sleeve 15, the spacing piece 110 or the like. Furthermore, the support sleeve 15 and the first piston 20 may be arranged partly or entirely nested, the support sleeve 15 being nested within the first piston 20. In addition, instead of a percussion piston moving back and forth by the action of a pressure medium, another kind of percussion element 10 for generating the percussion pulses required in rock breaking can be used. Thus, the percussion element 10 may be for instance a percussion element based on the magnetostrictive effect, with which stress pulses can be generated in a tool coupled to the drilling machine.

Furthermore, the shank 12 refers generally taken to a piece that comprises at least a percussion surface 13 for receiving stress pulses generated with the percussion element 10. The shank 12 may comprise connecting elements for fastening a drilling tool. Alternatively, the shank 12 may be integrated as part of the drilling tool.

The throttle 29 between the third pressure space 27 and the second pressure space 28 can comprise a clearance between the shoulder 26 and the frame 9c or the shoulder 26 may be provided with other kinds of narrow gaps. Furthermore, the frame 9c may be provided with a duct that connects the pressure spaces and is dimensioned tight or equipped with a suitable throttling component. The throttle 29 may also be composed of a plurality of different throttling elements.

It is further feasible to dimension the clearances of the frame 9c and the front end of the first piston 20, and further, the first discharge channel 37 in a manner eliminating the need for the second pressure duct 33. In this case, the pressure acting in the third pressure space 27 can be affected fixedly by the dimensions of the clearances or adjustably by arranging an adjustable throttle in the discharge channel 37.

The drawings and the related description are only intended to illustrate the inventive idea. The details of the invention may vary within the scope of the claims.

The invention claimed is:

1. A rock drilling machine comprising at least:
   a frame;
   a percussion element for generating stress pulses;
   a shank arranged at the front of the percussion element in the percussion direction, the shank comprising a percussion surface for receiving said stress pulses; and
   an axial bearing comprising at least: a first piston and a second piston; between the pistons, an axial first contact surface and an axial second contact surface, said first and second axial contact surfaces being perpendicular to a longitudinal axis of the drilling machine, the contact surfaces being located in the same pressure space; at least one pressure duct for leading pressure fluid from a pressure source to the axial bearing; pressure surfaces in the pistons, on which surfaces the pressure fluid is arranged to act for axial movement of the pistons; and in which the pistons are arranged in the axial bearing to push the shank along a different travel length towards the percussion direction; the force of said pistons, by the action of the pressure fluid towards the percussion direction, being dimensioned such that the percussion surface is adjustable during drilling at the desired axial point for receiving the stress pulses, wherein the same pressure fluid fed to the axial bearing is arranged to act on said piston contact surfaces and pressure surfaces.

2. A rock drilling machine as claimed in claim 1, wherein behind the second piston is provided a first pressure space that is in contact with the at least one pressure duct for feeding pressure fluid to the axial bearing, the first contact surface and the second contact surface are located in a second pressure space in front of the first pressure space, and the pressure fluid fed to the axial bearing is arranged to flow from the first pressure space to the second pressure space.

3. A rock drilling machine as claimed in claim 2, wherein a third pressure space is provided in front of the first contact surface, and pressure fluid is arranged to flow from the second pressure space to the third pressure space.

4. A rock drilling machine as claimed in claim 3, wherein between the third pressure space and the second pressure space is provided at least one throttle arranged to act on the pressure acting in the second pressure space by throttling the flow of pressure fluid between said second and third pressure spaces.

5. A rock drilling machine as claimed in claim 3, wherein the third pressure space is in contact with at least one second pressure duct, and at least one element for affecting the pressure acting in the third pressure space is provided in the second pressure duct.

6. A rock drilling machine as claimed in claim 1, wherein the at least one pressure duct is in contact with a percussion pressure duct of the rock drilling machine, and the first pressure duct comprises at least one throttle for affecting the flow of pressure fluid.

7. A rock drilling machine as claimed in claim 1, wherein the first piston and the second piston are sleeve-like pieces arranged around the percussion element or the shank.

8. A rock drilling machine as claimed in claim 7, wherein the first piston is an elongated sleeve supported by the frame in the area of its first and second ends, in the section between the first end and the second end, the first piston comprises a shoulder provided on the outer periphery of the sleeve, the shoulder having an axial first contact surface pointing in a direction opposite to the percussion direction, the second piston is around the first piston, and the second piston comprises a second contact surface pointing in the percussion direction and arranged in the same pressure space as said axial first contact surface.

9. A rock drilling machine as claimed in claim 1 wherein the axial bearing is located at least mainly behind the percussion element, the percussion element is a sleeve-like piece, and the first piston is configured to act on the shank by means of an elongated spacing piece that is at least partly inside the percussion element.

10. A rock drilling machine as claimed in claim 1 wherein the axial bearing is located at least mainly behind the percussion element, the percussion element is a sleeve-like piece, and the first piston is arranged partly nestled within the sleeve-like percussion element and arranged to act through the percussion element on the shank.

11. A rock drilling machine as claimed in claim 1 wherein the axial bearing is located at least mainly behind the percussion element, the percussion element is a sleeve-like piece, and the shank is provided with a section, which is arranged at least partly nestled within the percussion element and on which the first piston is arranged to act.

12. An axial bearing for a percussion rock drilling machine, the axial bearing comprising at least:

a frame;

at least a first piston and a second piston arranged in a space formed in the frame, both comprising at least one pressure surface;

at least one pressure duct for leading pressure fluid to said pressure surfaces for axial movement of the pistons; and, between the pistons, axial contact surfaces located in the same pressure space, said first and second axial contact surfaces being perpendicular to a longitudinal axis of the drilling machine, wherein the same pressure fluid fed to the axial bearing is arranged to act on said piston contact surfaces and pressure surfaces.

13. A rock drilling machine comprising at least:

a frame;

a percussion element for generating stress pulses;

a shank arranged at the front of the percussion element in the percussion direction, the shank comprising a percussion surface for receiving said stress pulses; and an axial bearing comprising at least: a first piston and a second piston; between the pistons, an axial first contact surface and an axial second contact surface, the contact surfaces being located in the same pressure space; at least one pressure duct for leading pressure fluid from a pressure source to the axial bearing; pressure surfaces in the pistons, on which surfaces the pressure fluid is arranged to act for axial movement of the pistons; and in which the pistons are arranged in the axial bearing to push the shank along a different travel length towards the percussion direction; the force of said pistons, by the action of the pressure fluid towards the percussion direction, being dimensioned such that the percussion surface is adjustable during drilling at the desired axial point for receiving the stress pulses, wherein the same pressure fluid fed to the axial bearing is arranged to act on said piston contact surfaces and pressure surfaces;

behind the second piston is provided a first pressure space that is in contact with the at least one pressure duct for feeding pressure fluid to the axial bearing, the first contact surface and the second contact surface are located in a second pressure space in front of the first pressure space, and the pressure fluid fed to the axial bearing is arranged to flow from the first pressure space to the second pressure space.

14. An axial bearing for a percussion rock drilling machine, the axial bearing comprising at least:
- a frame;
- at least a first piston and a second piston arranged in a space formed in the frame, both comprising
- at least one pressure surface;
- at least one pressure duct for leading pressure fluid to said pressure surfaces for axial movement of the pistons; and,
- between the pistons, axial contact surfaces located in the same pressure space, wherein the same pressure fluid fed to the axial bearing is arranged to act on said piston contact surfaces and pressure surfaces, behind the second piston is provided a first pressure space that is in contact with the at least one pressure duct for feeding pressure fluid to the axial bearing, a first contact surface and a second contact surface are located in a second pressure space in front of the first pressure space, and the pressure fluid fed to the axial bearing is arranged to flow from the first pressure space to the second pressure space.

* * * * *